F. CRIEST.
TROLLEY.
APPLICATION FILED APR. 14, 1911.
1,003,881.
Patented Sept. 19, 1911.
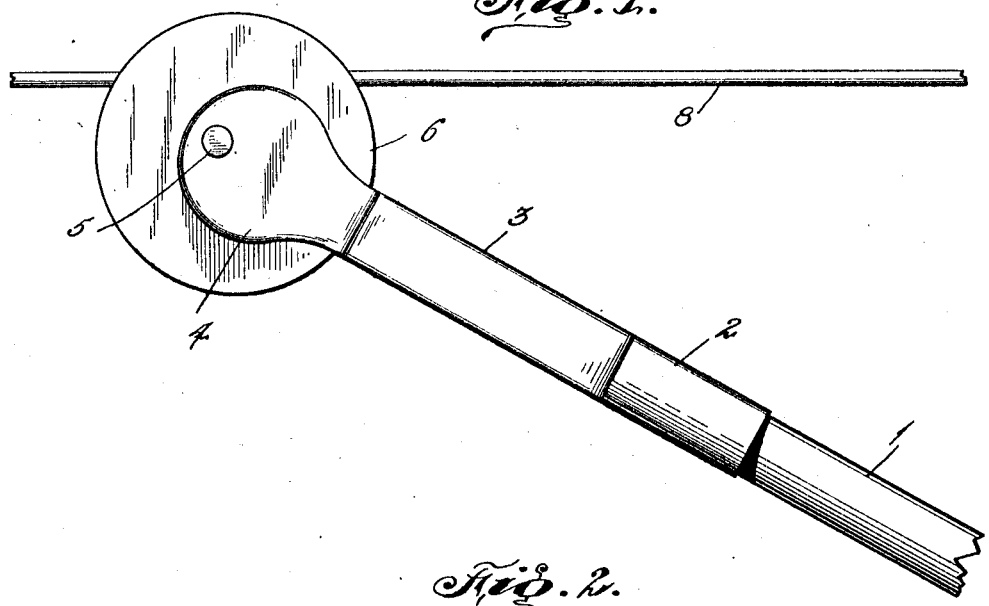
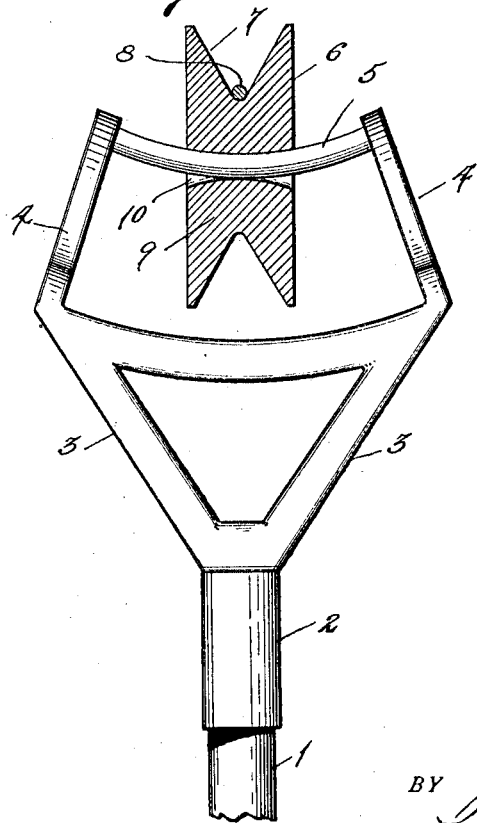
WITNESSES:
INVENTOR.
F. Criest
BY
ATTORNEYS

UNITED STATES PATENT OFFICE.

FRANK CRIEST, OF BUTLER, PENNSYLVANIA.

TROLLEY.

1,003,881.  Specification of Letters Patent. Patented Sept. 19, 1911.

Application filed April 14, 1911. Serial No. 621,120.

*To all whom it may concern:*

Be it known that I, FRANK CRIEST, a citizen of the United States of America, residing at Butler, in the county of Butler and State of Pennsylvania, have invented certain new and useful Improvements in Trolleys, of which the following is a specification, reference being had therein to the accompanying drawing.

This invention relates to trolleys, and the objects of my invention are, first, to furnish a trolley pole with a harp that will allow the trolley wheel of the harp to shift and accommodate itself to the trolley wire or electric conductor; second, to provide a trolley harp and wheel that can be advantageously used upon high speed suburban electric lines; third, to provide a trolley harp that will normally maintain the trolley wheel thereof upon the trolley wire irrespective of any irregularities or curved sections of the wire, and fourth, to provide a trolley harp that is simple in construction, applicable to the present type of trolley pole, and highly efficient for the purposes for which it is intended.

The above objects are attained by a mechanical construction that will be hereinafter specifically described and then claimed.

Reference will now be had to the drawing, wherein:—

Figure 1 is a side elevation of the trolley, and Fig. 2 is a front elevation of the same, showing the trolley wheel in section.

The reference numeral 1 denotes a portion of a trolley pole and mounted upon the upper end of this pole is a sleeve 2 supporting a triangular frame 3. The upper side edges of the frame 3 are provided with converging arms 4 and connecting the upper ends of said arms is a curved journal pin 5. The arms 4 are disposed at an obtuse angle to the side edges of the frame 3 and said arms, the frame 3 and the sleeve 2 are in a plane common to the pole 1. The arms 4 are enlarged to firmly support the journal pin 5 and the top of the frame 3 is curved and in parallelism with the curved journal pin 5. Revolubly and shiftably mounted upon the pin 5 is a trolley wheel 6 having an annular groove 7 for a trolley wire or electric conductor 8. The trolley wheel 6 has a central bore 9 for the pin 5 and the ends of the bore are flared or enlarged, as at 10 to permit of the wheel 6 revolving and shifting upon the pin 5. The wheel 6 can assume a position in parallelism with either of the arms 4 and at an angle to the pole 1, thereby allowing a car or vehicle to pass around a curved section of track without materially altering the position of the trolley wheel 6 relatively to the wire 8.

While in the drawing there is illustrated a preferred embodiment of the invention, it is to be understood that the structural elements thereof are susceptible to such changes as fall within the scope of the appended claims.

What I claim is:—

1. A trolley comprising a pole, a frame mounted thereon and provided at its top with a pair of arms, a curved journal pin mounted in said arms and a trolley wheel revolubly and shiftably mounted upon said pin, said trolley wheel having a bore with each end thereof flared, said pin extending through said bore and the flared end of the bore providing clearances for the pin, the curvature of the pin being such with respect to the curvature of the wall of the bore that as the wheel revolves, the upper portion of the wall of the bore throughout will engage the top of the pin.

2. A trolley comprising a pole, a sleeve mounted upon the upper end thereof, a triangular-shaped frame projecting from the outer end of said sleeve, converging arms integral with the upper corners of said frame, a curved journal pin mounted in the upper ends of said arms, and a trolley wheel revolubly and shiftably mounted upon said pin, said trolley wheel having a bore with each end thereof flared, said pin extending through said bore and the flared end of the bore providing clearances for the pin, the curvature of the pin being such with respect to the curvature of the wall of the bore that as the wheel revolves, the upper portion of the wall of the bore throughout will engage the top of the pin.

In testimony whereof I affix my signature in the presence of two witnesses.

FRANK CRIEST.

Witnesses:
E. M. PERRIN,
E. E. BELL.

Copies of this patent may be obtained for five cents each, by addressing the "Commissioner of Patents, Washington, D. C."